Aug. 16, 1927.

S. H. PERRON

MUSICAL INSTRUMENT

Filed June 3, 1922

Inventor
Samuel H. Perron
by
atty

Aug. 16, 1927.

S. H. PERRON

MUSICAL INSTRUMENT

Filed June 3, 1922

Inventor,
Samuel H. Perron

Aug. 16, 1927.
S. H. PERRON
MUSICAL INSTRUMENT
Filed June 3, 1922    6 Sheets-Sheet 3
1,639,107
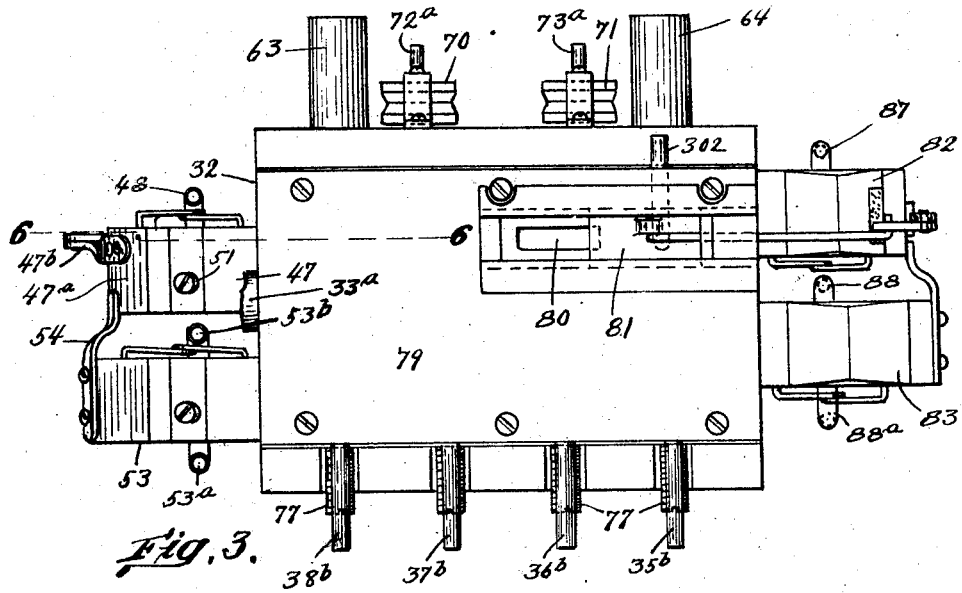
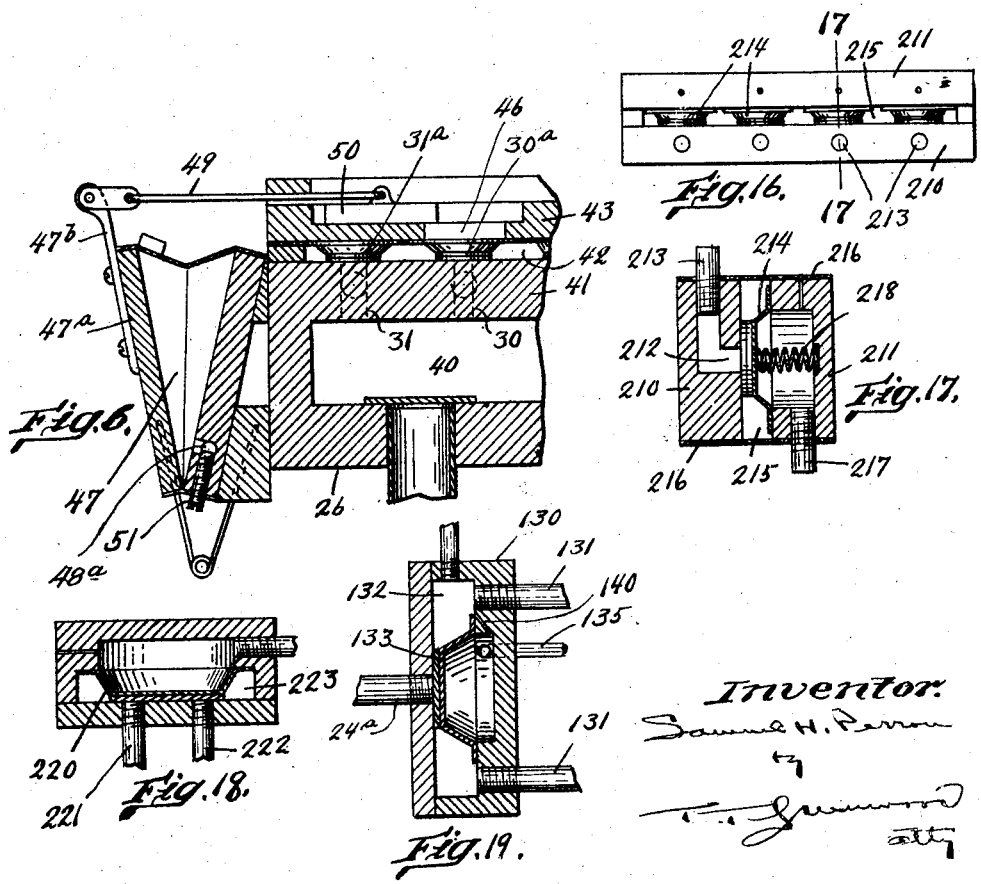

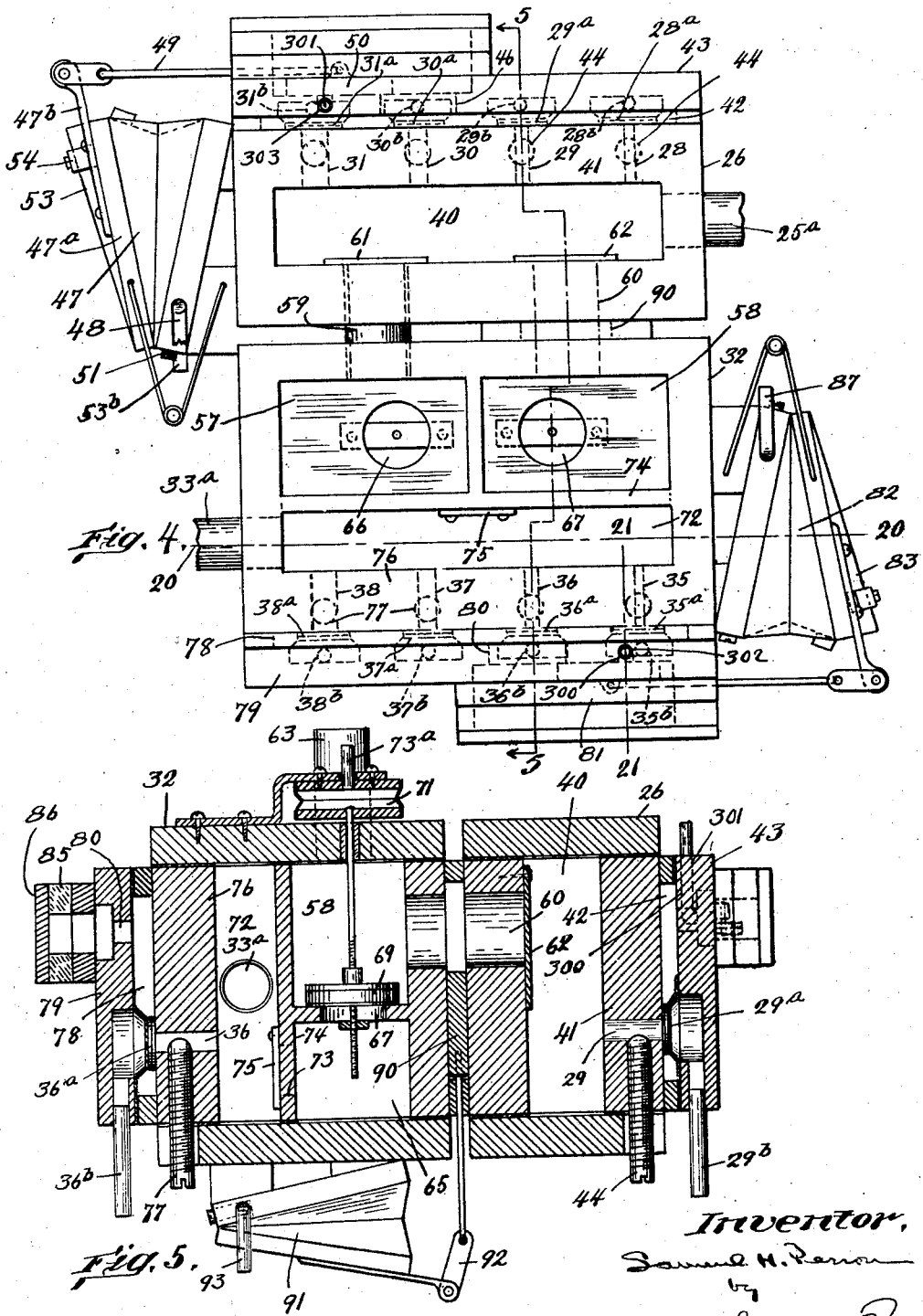

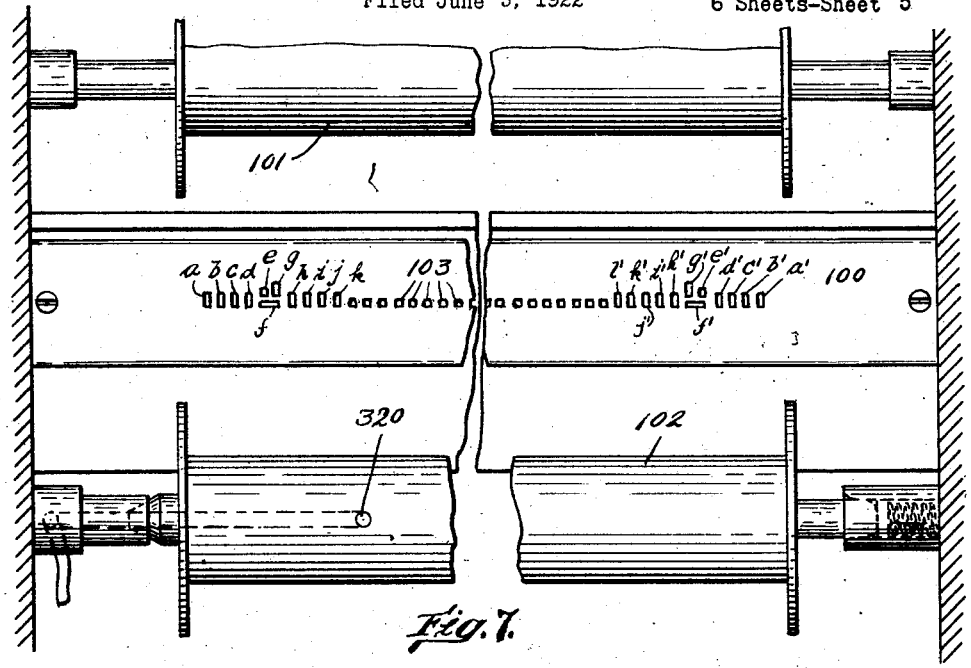
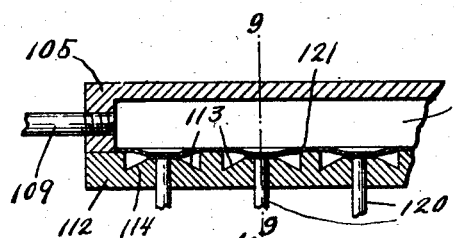
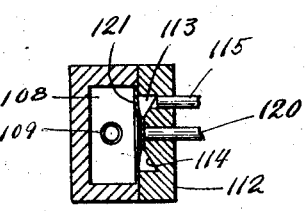
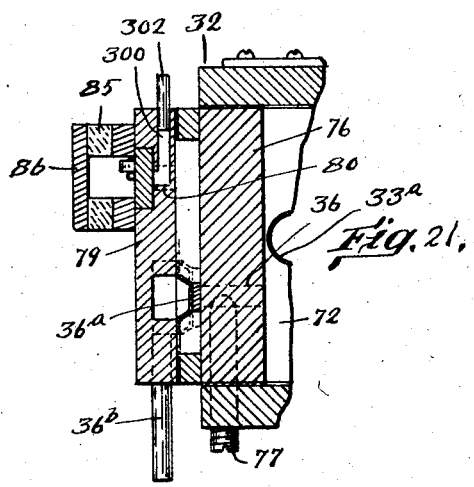

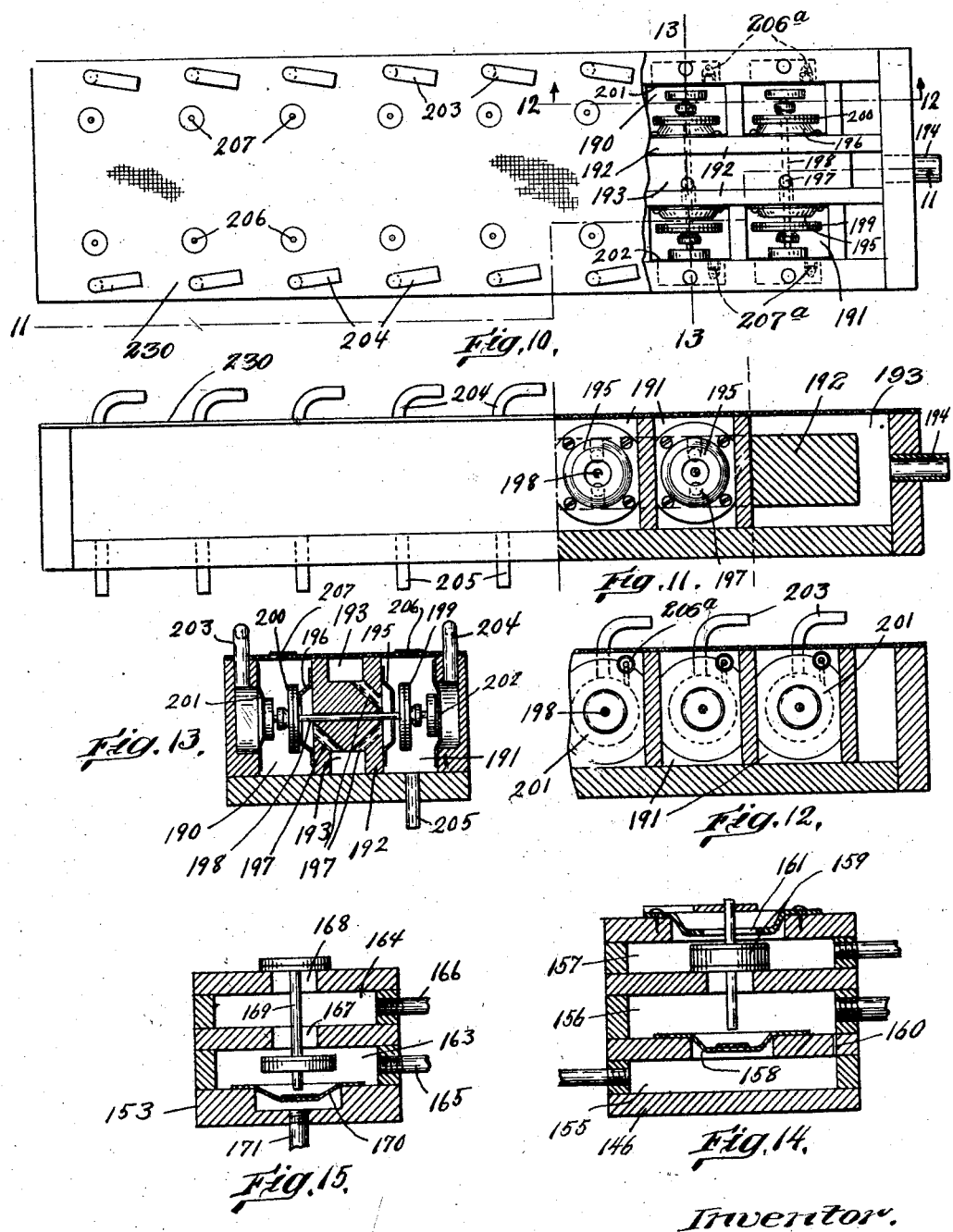

Patented Aug. 16, 1927.

1,639,107

UNITED STATES PATENT OFFICE.

SAMUEL H. PERRON, OF MENDON, MASSACHUSETTS, ASSIGNOR TO ALEXANDER STEINERT, OF BOSTON, MASSACHUSETTS.

MUSICAL INSTRUMENT.

Application filed June 3, 1922. Serial No. 565,527.

This invention relates to automatic musical instruments of the type wherein a perforated note sheet or its equivalent is employed to govern the playing of the instrument and has particular reference to pianos which are now known as reproducing pianos.

A reproducing piano is one arranged automatically and faithfully to reproduce the characteristic shadings of the artistic performance of a skilled pianist; and for this purpose, is provided with expression mechanism by which to produce variations in intensity effect from pianissimo to fortissimo and also with mechanism to produce the loud and soft pedal effects. The note sheet for such a reproducing piano has the usual and necessary note perforations for the piano strings and also has the various expression holes or perforations which control the various expression devices. It may also have other holes to control other apparatus. A reproducing piano is usually, though not necessarily, governed by pneumatic means and has a tracker formed with openings corresponding to the notes of the piano and which are adapted to register with perforations in the note sheet as it travels over the tracker for the playing of the notes. In addition to the note openings, the tracker has numerous other openings adapted to register with the corresponding additional perforations in the note sheets by which to govern the expression of the notes played by the piano and to effect the other control operations of the piano as, for instance, the re-roll of the note sheet after the composition has been finished.

The different makes of reproducing pianos have different arrangements of the expression and control devices and different arrangements of the corresponding holes in the tracker to govern said devices; and corresponding located holes in the trackers of different makes of piano do not govern the same expression and control devices.

In a co-pending application, Serial No. 484,257, filed July 12, 1921, I have described a reproducing piano having means by which the piano may be conditioned to be controlled accurately by different types of note sheets whereby the piano may render accurately the expression and other effects of various makes of note sheets.

The present invention has for an object to provide a reproducing piano adapted to play different makes of note sheets and includes an expression mechanism adapted to be controlled by the various types of note sheets to accurately and faithfully reproduce the expression effects incorporated in the various types of note sheets.

The more or less usual type of expression mechanism includes a pump or equivalent for exhausting air from the player system and a valve in the player system governed by various dynamics controlled by the various perforations in the note sheets to vary the setting of the valve whereby to govern the suction pressure at the striker pneumatics and, consequently, to govern the intensity of the notes sounded by the piano.

It is a further object of this invention to provide an expression device adapted to be controlled by various types of note sheets to regulate the intensity of the notes and dispense with the usual regulating valve.

A further object is generally to improve the construction and operation of reproducing pianos.

Fig. 3 is a side elevation of the expression mechanism embodying my invention.

Fig. 4 is a plan view of the expression mechanism of Fig. 3 with the top cover plate removed.

Fig. 5 is a section along lines 5—5 of Fig. 4.

Fig. 6 is a sectional detail along lines 6—6 of Fig. 3, illustrating mechanism for producing crescendo effects.

Fig. 7 is a front detail of the note rolls and tracker of the piano.

Fig. 8 is a longitudinal sectional view through a selector valve box illustrated in Fig. 1.

Fig. 9 is a transverse section along lines 9—9 of Fig. 8.

Fig. 10 is a plan view, partly in section, of a lock and cancel valve.

Fig. 11 is a view along line 11—11 of Fig. 10.

Fig. 12 is a section along lines 12—12 of Fig. 10.

Fig. 13 is a sectional detail along lines 13—13 of Fig. 10.

Fig. 14 is a transverse sectional view through a valve of a secondary valve box.

Fig. 15 is a transverse sectional view through a valve of a primary valve box.

Fig. 16 is a plan view of a relay valve box.

Fig. 17 is a transverse section along line 17—17 of Fig. 16.

Fig. 18 is a transverse sectional view of a control valve for the accent valve of the expression box.

Fig. 19 is a sectional view through a cut-off valve interposed between the pump and the expression box.

Fig. 21 is a sectional detail along line 21—21 of Fig. 4.

Figure 1:
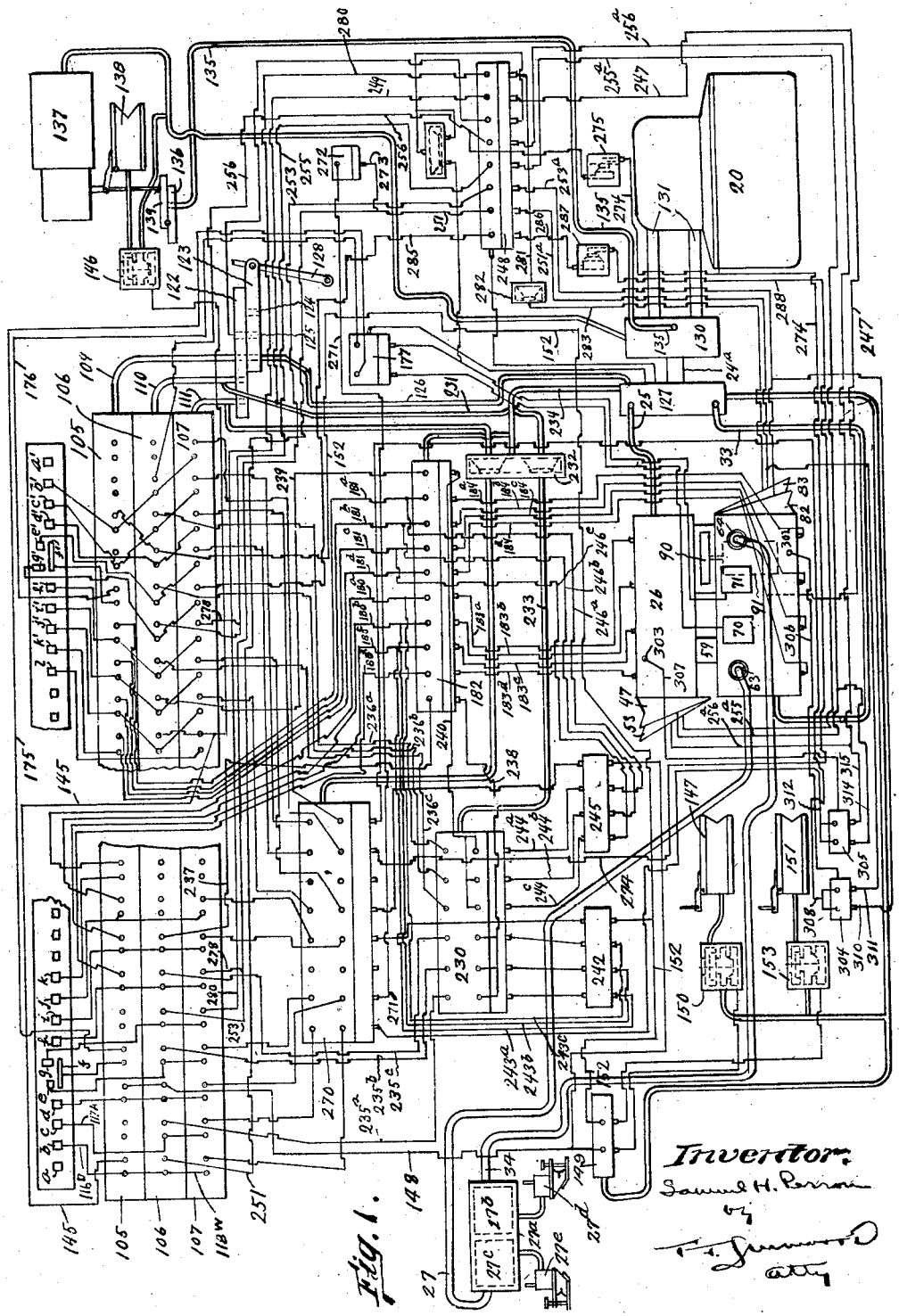
Fig. 1 is a diagram of the expression and other control apparatus of a reproducing piano constructed and arranged in accordance with my invention.

The various types of note sheets adapted to control the reproducing piano and embodying the invention have different systems for obtaining the various degrees of expression but generally the note sheets are arranged to control apparatus to vary the degrees of suction in the wind chest of the piano whereby to vary the force of the blow on the strings of the piano by the striker pneumatics and the valve is adapted to be held in set position for so long as the particular degree of intensity is to be maintained, although its position may be varied automatically to maintain the suction for which it is set.

The apparatus embodying the present invention is designed to eliminate the interposed regulating valve, and the wind chest of the piano is adapted to be in constant and free communication with the pump. Regulation of the expression effect is obtained by admitting atmospheric air to the required degree into the connection between the wind chest and the pump; and the admission of atmospheric air serves to reduce the suction at the wind chest in proportion to the amount of atmospheric air admitted and, consequently, to vary the force at which the striker pneumatics associated with the wind chest strike the strings of the piano. The expression mechanism is diagrammatically illustrated in Fig. 2.

The pump 20, as here shown, is electrically driven and of the centrifugal exhauster type and includes the rotatable shaft 21 having the spaced impellers 22 thereon. Guide vanes 23 are disposed between the impellers to receive the air from the uppermost impeller and guide and direct it into the intake of the next lowermost impeller and the air is discharged through suitable sound deadening devices, not here shown, from the base of the pump. The pump herein shown is particularly adapted for use in connection with my invention and has the characteristic of providing a substantially constant suction pressure regardless of the number of striker pneumatics in action, which characteristic is inherent with this type of pump. A pipe 24 of suitable cross sectional area connects the pump with the expression apparatus and said pipe 24 is in communication with a pipe 25 which is of substantially less cross-sectional area than said pipe 24. Said pipe 25 is in communication with an expression box 26. A pipe 27, which may be of any suitable size, extends from said expression box 26 to the wind chest $27^a$ in the usual manner.

Said wind chest $27^a$ may be of the usual construction and is divided into a treble compartment $27^b$ and a bass compartment $27^c$, and said pipe 27 may communicate with, say, the bass compartment $27^c$. Striker pneumatics, one of which is illustrated at $27^d$, may be controlled by the treble side $27^b$ of the wind chest and other striker pneumatics, one of which is illustrated at $27^e$, may be controlled by the bass side of the wind chest, in more or less the usual manner.

The expression box 26 is provided with a series of, preferably graduated, apertures 28, 29, 30 and 31 and said apertures are controlled by the valves $28^a$, $29^a$, $30^a$ and $31^a$. Said apertures communicate with the outside atmospheric air and the valves thereof are controlled by expression perforations in note sheets passed over the tracker of the piano and in a manner hereinafter to be described. When all of said apertures are closed and, as a consequence, no air is admitted directly from the atmosphere into the expression box mechanism the maximum suction effect of the pump 20 is manifested at the treble side of the wind chest and, consequently, the striker pneumatics associated with said wind chest will strike the strings of the piano with the greatest intensity. When, however, one of the apertures of the expression box 26 as for instance, the aperture 28, is opened by the suitable control of its valve $28^a$, atmospheric air is admitted into said box and the suction pressure therein is reduced in proportion to the amount of air admitted. Consequently, the suction pressure at the treble wind chest is reduced and a lesser degree of intensity is produced. If a larger aperture, as for instance, the aperture 30 is opened an increased amount of atmospheric air will pass into the expression box and the suction at the wind chest will be reduced still further and a lesser degree of intensity will be produced. The various degrees of intensity may thereby be produced by suitably operating the various valves $28^a$, $29^a$, $30^a$, $31^a$ to uncover the various apertures 28, 29, 30, 31, whereby to admit variable amounts of atmospheric air into the expression box 26. The maximum degree of intensity is provided when all of the apertures are closed and lesser degrees of intensity may be obtained by opening a selected aperture. Still lesser degrees of intensity may be provided by opening combinations of apertures simultaneously, as for instance, apertures 28 and 31, or apertures 28 and 30 and 31, etc., and the minimum intensity effect, or pianissimo, is obtained when all apertures are opened and the maximum amount of atmospheric air passes into the expression box.

A second expression box 32 is also provided and said box is connected through a pipe 33 with the pipe 24 leading to the pump 20 and is in parallel with the box 26. Said pipes 24 and 33 are preferably of equal cross sectional area. A pipe 34, which may be similar to the pipe 27, extends from said expression box 32 in the usual manner, to the treble side 27$^b$ of the wind chest. Said two expression boxes are more or less similar, with exceptions hereinafter to be set forth, and said expression box 32 is provided with the apertures 35, 36, 37, and 38 and said apertures are controlled by the valves 35$^a$, 36$^a$, 37$^a$, and 38$^a$. The control of said expression box 32 is effected in a manner similar to the control of the expression box 26 and serves to vary the suction in the treble side of the wind chest and consequently the intensity of the notes controlled from the treble side of the wind chest. For certain types of note sheets, the control of both the bass and treble is effected through one expression box and the notes are accented through the other box, and, with another type of note sheet, the expression of the bass and treble notes are each independently controlled by an expression box. The various air passages connecting the striker pneumatics with the suction device are substantially unvarying in volume, that is, the volumes of the passages are not adapted to be increased or decreased to accomplish expression-variations and, consequently, the passages constitute a connection of fixed capacity between the striker pneumatics and suction device.

Figure 2:
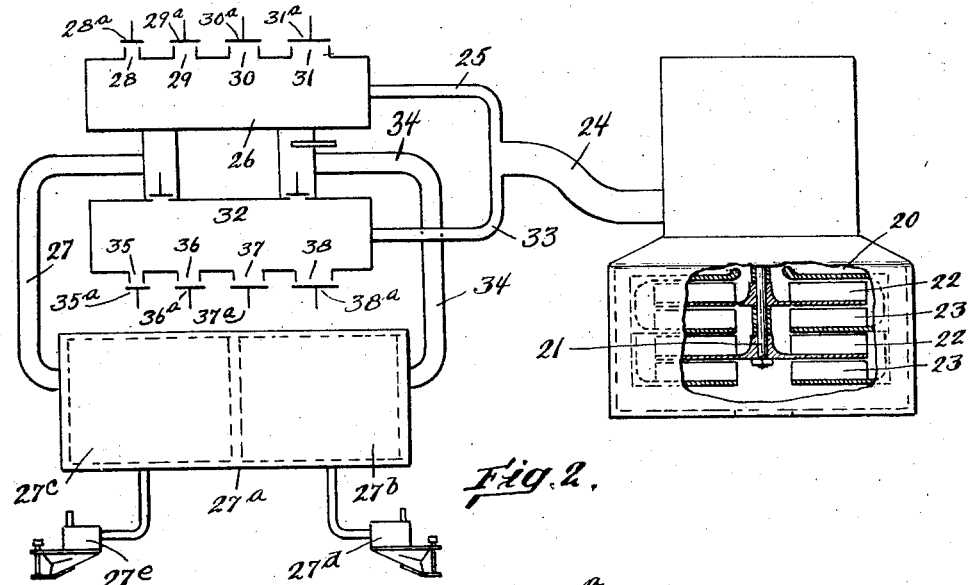
Fig. 2 is a diagram illustrating the principle of the expression mechanism.
Figure 20:
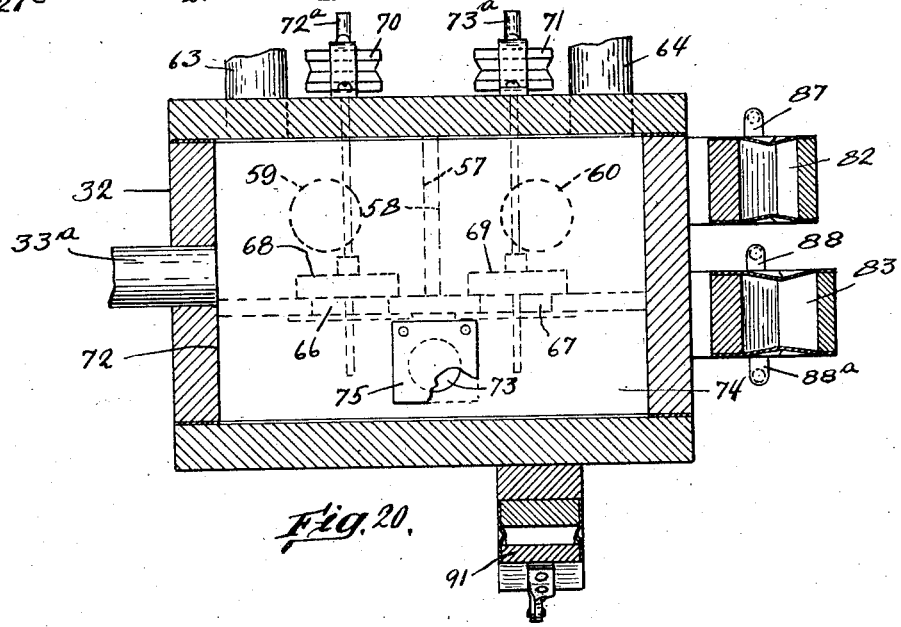
Fig. 20 is a section along line 20—20 of Fig. 4.

Figs. 3, 4, and 5 illustrate a suitable specific construction of the expression box diagrammatically illustrated in Fig. 2. Said expression boxes 26 and 32 are herein shown as mechanically connected though they may be mechanically independent of each other when desired. The expression box 26 is provided with a chamber or compartment 40 and apertures 28, 29, 30, and 31 extend through a wall 41 of the box and are adapted to be placed in communication with an atmospheric air passage 42 covered by the plate 43. Adjusting screws 44 are or may be arranged to restrict to a desired degree, the size of said passages 28, 29, 30, 31, whereby suitably to regulate the relative sizes of the passages and said passages are arranged to be graduated in size from the smallest passage 31 to the largest passage 28. Said passages are or may be controlled by the pouch valves 28$^a$, 29$^a$, 30$^a$, 31$^a$ carried by the plate 43 and tubes 28$^b$, 29$^b$, 30$^b$, and 31$^b$, serve to connect said pouch valves with proper control devices which are arranged to admit suction to the back of said pouch valves whereby to open them and place the chamber 40 in communication with the passage 42, and also to admit atmospheric pressure to the back of said pouches and close the passages 28, 29, 30, and 31.

Normally all of said valves are connected to suction and held open whereby to obtain the lowermost degree of intensity effect, or pianissimo.

Said passage 42 is adapted to be placed in communication with outside atmosphere through the slot 46 in said plate 43.

For one type of roll the various degrees of intensity are controlled by governing the opening and closing of the pouch valves above described, and crescendo or diminuendo effects are or may be controlled by governing the period between the closing or opening, respectively of successive valves. For another type or roll, a crescendo bellows is employed to obtain crescendo and diminuendo effects. For such type of roll, a crescendo bellows 47 is suitably secured to the expression box 26 and a tube 48 is arranged to connect the interior of said bellows through passage 48$^a$ with suitable controlling devices. The movable side 47$^a$ of said bellows is provided with an arm 47$^b$ to which a link 49 is pivotally connected. Said link 49 is also pivotally connected with a slide valve 50 which is disposed in or on said plate 43 and is adapted to be moved over said slot 46 to vary the extent of opening of, and close, said slot. It is obvious that as said crescendo bellows 47 is gradually collapsed by the evacuation thereof, said slide valve 50 will be moved gradually over the slot 46 whereby to restrict the flow of atmospheric air through said slot into the expression box and thereby gradually bring up the tone of that portion of the instrument associated with said box; and when said crescendo bellows again expands, it operates said slide valve 50 in the reverse direction to uncover the slot 46 and thereby reduce the intensity of that portion of the piano associated with said box. The rate of collapse and expansion of the crescendo bellows may be governed in any suitable manner as by the screw 51 for instance, whereby to vary the rate of collapse and opening of the bellows and thereby regulate the time required to raise and lower the intensity of the piano to the intensity determined by the setting of the valves 28$^a$, 29$^a$, 30$^a$, 31$^a$. For a certain type of roll, it is desirable to obtain fast and also slow crescendo and diminuendo effects. For this purpose, I prefer to arrange the bellows 47 as the fast crescendo bellows and provide a second or similar bellows 53 to obtain slow crescendo effects. The slow crescendo bellows 53 may be provided with an arm 54 free from but adapted to engage the movable side 47$^a$ of the fast crescendo bellows and move it whereby to actuate the slide valve 50. The fast crescendo bellows 47 will not be operated when the slow crescendo bellows 53 is operated. The slow crescendo bellows is adapted, obviously, to have a slower rate of opening than the fast crescendo bellows whereby the intensity of the piano will be raised or reduced at a decreased rate of speed.

The slow crescendo bellows 53 is provided with two tubes 53$^a$ and 53$^b$ by which communication with the interior of the bellows is established. Said tube 53$^a$ is arranged to have a restricted opening whereby to provide for the slow collapse and opening of the bellows and said tube 53$^b$ is arranged to be unrestricted and provide particularly, the rapid opening of the bellows for the purpose to be described.

The chamber 40 of the expression box 20 is adapted to be placed in communication with the pump through the pipe 25$^a$. Said expression box 26 is adapted to control the base portion of the wind chest for a certain type of note sheet and is adapted to control the accent, or theme, notes for a different type of note sheet. Said chamber 40 of the expression box is in communication with the chamber 65 of the expression box 32 through passages 59 and 60, chambers 57 and 58 and apertures 66 and 67. The flow of air through said apertures 66 and 67 are controlled by the base and treble accent valves 68 and 69 respectively. Said valves are disposed in position to cover or uncover said openings 66 and 67 and are controlled by the bellows 70 and 71 respectively, and said bellows are adapted to be placed in communication with suitable control devices by means of the pipes 72$^a$ and 73$^a$ respectively. The chamber 65 is in communication with the chamber 72 of said expression box 32 through an aperture 73 in the wall 74. A flap valve 75 is arranged over said aperture 73 to prevent a flow of air from the chamber 72 into said chamber 65 but is arranged to open and uncover the passage 73 and permit the free flow of air in the normal direction. Said chamber 72 is adapted to be connected with the pump by means of the pipe 33$^a$. A wall 76 of the expression box 32 is or may be formed with the passages 35, 36, 37 and 38 therein which are preferably graduated in internal dimensions in a manner similar to the corresponding passages in the expression box 26 and regulating screws 77 may extend a variable distance into said passages to regulate the size thereof. Said passages are adapted to communicate with an atmospheric air passage 78 which is covered by the plate 79. A slot or aperture 80 in said plate 79 is adapted to establish communication between said passage 78 and the outside atmospheric air. Pouch valves 35$^a$, 36$^a$, 37$^a$, 38$^a$, are carried by said plate 79 and are arranged to cover or uncover the passages 35, 36, 37 and 38 and be operated in a manner similar to the corresponding pouch valves of the expression box 26. Said pouch valves are adapted to be placed in communication with suitable control devices by the pipes 35$^b$, 36$^b$, 37$^b$, and 38$^b$ and a slide valve 81 is adapted to cover or uncover said slot 80 and is operated by a fast crescendo bellows 82. A slow crescendo bellows 83 is also provided and said valve and fast and slow crescendo bellows are or may be constructed and operated in a manner similar to construction and operation of the corresponding devices associated with the expression box 26. Means may be provided to muffle the sound of air as it passes through said slot 80 into the expression box and said muffling means may include the wall 85 of suitable porous material, as felt, and an impervious cover plate 86. The passage of air into the corresponding slot or aperture 46 of the expression box 26 may be similarly muffled. The communication with the fast and slot crescendo bellows 82 and 83 respectively may be established through the pipes 87 and 88 respectively. Said slow crescendo bellows 83 also has a pipe 88$^a$ by which to obtain rapid opening of the bellows, as will be described.

For certain type of note sheet the expression perforations are such that the general tone of the piano is raised and lowered through the expression box 32 and for this purpose the accent bellows 70 and 71 are adapted to be collapsed to lift valves 68 and 69 and uncover the apertures 66 and 67 whereby to permit air to flow from the base and treble wind chests through the pipes 63 and 64 respectively into the chamber 72 of said expression box 32 and out of said chamber through the pipe 33$^a$ to the pump. The opening or closing of a pouch valve, as 36$^a$ or 37$^a$, for instance, serves to increase or decrease the amount of atmospheric air admitted into the chamber 72 whereby to decrease or increase the intensity of the note sounded by the striker pneumatics controlled from both the bass and treble sides of the wind chest of the piano. Normally, for said type of note sheet, the intensity of the theme notes are increased one step over the accompaniment notes and consequently, an accent valve, which may be either the valve 68 or 69 depending upon whether the theme notes occur on the bass or the treble side of the wind chest, will be closed and that portion of the wind chest will consequently be placed in communication with the expression box 26. One of the pouch valves associated with said expression box 26 as for instance, the pouch valve 31ª controlling the largest passage 31, consequently will be closed whereby to increase the intensity of the theme notes over the accompaniment notes. The intensity of the theme notes may be governed by suitable operation of said pouch valves whereby to increase or decrease the amount of atmospheric air admitted into the expression box 26. If the theme notes come in the treble side of the wind chest, the accent valve 69 will be closed and if the theme notes come on the bass side of the wind chest, the accent valve 68 will be closed. The intensity of the accompaniment and theme notes may be raised or lowered independently by suitable operation of the pouch valves associated with the expression boxes 32 and 26 respectively.

The expression perforations of another type of note sheet are so arranged that the bass and treble notes are governed independently and consequently, means must be provided to isolate the expression box 32 from the expression box 26, or, more correctly to isolate the treble side of the wind chest from the expression box 26. Said means includes the slide valve 90 which is disposed to close or open the passage 60 connecting said expression boxes 32 and 26. Said valve may be controlled by suitable means as the bellows 91 which may be secured to the lower side of the expression box 32 and connected through a link 92 with said slide valve. Said bellows 91 may have the pipe 93 by which connection may be made between the bellows and suitable control means. When the first mentioned type of roll is played, said bellows 91 is preferably arranged to be in open position and the slide valve 90 is consequently in a position to uncover the passage 60 and permit communication between said expression box 26 and the expression box 32. When the second mentioned type of note sheet is played, said bellows 91 is placed under suction and is consequently collapsed and the valve 90 is moved to close the passage 60. When the slide valve 90 is closed, the valve 68 may also be arranged to be closed, which will effectively close communication between the units 26 and 32.

Said second mentioned type of note sheet, as above stated, is arranged to govern independently the intensity of the notes controlled by apparatus associated with the bass and treble sides of the wind chest. Said note sheet is provided with suitable expression perforations in one margin thereof which govern suitable devices to actuate the pouch valves associated with the expression box 26 to govern the intensity of the notes struck from the bass side of the wind chest, and the number of pouch valves opened or closed determines the particular intensity effect produced. With this arrangement air flows from the bass side of the wind chest through the pipe 63 into the chamber 57 of the expression box 32 and through the passage 59 into the expression box 26. The accent valve 68 in said chamber 57 is arranged to be closed while this type of note sheet is played and thereby prevents communication between the bass side of the wind chest and the expression box 32. The expression box 26 is isolated from the treble side of the wind chest by the valve 90 which is held in raised position to close the passage 60. The treble side of the wind chest is controlled from the expression box 32 and for this purpose the accent valve 69 is held in raised position during the playing of the note sheet and communication is established from the treble side of the wind chest through the pipe 64 and the chamber 58 through said valve 69 into the chamber 72 of said expression box 32. The pouch valves associated with said expression box 32 are opened and controlled by the expression perforations formed in the other margin of the note sheet to vary the intensity of the notes struck by apparatus controlled by the treble side of the wind chest.

For a third type of note sheet, the various expression effects are arranged to be produced mainly by the fast and slow crescendo bellows associated with the expression boxes and the atmospheric air passages are arranged to be held open while this type of note sheet is in control of the instrument.

The means by which the various types of note sheets effect proper control of the expression mechanism above described whereby to effect accurate rendition of the various shadings of expression of the composition embodied in the note sheet includes the tracker 100. Said tracker is or may be placed in the usual position between the rolls 101 and 102. Said tracker is provided with the usual note openings 103 to control, in more or less the usual manner, the striker pneumatics associated with the bass and treble sides of the wind chest of the piano. Said note openings are adapted to register with corresponding perforations in the note sheet and when in register are adapted to effect the striking of the particular note associated with that opening. The tracker is also provided with other openings $a, b, c, d, e, f, g, h, i, j, k$, at the left of the row of note openings and other openings $a', b', c', d', e', f', g', h', i', j', k', l'$, at the right of the row of note openings and said openings are adapted to register with the expression and control perforations of the various types of note sheets whereby to effect the proper control of the intensity of the notes struck by the piano and also to effect other control operations, as for instance, the rewinding of the note sheet after the composition thereon has been played, and the loud and soft pedal effects. The expression perforation of one sheet adapted to control a certain degree of intensity may not coincide in location with the expression perforation of another type of note sheet adapted to control the same degree of intensity; for instance, an opening in the tracker, as the opening $b$, is adapted to register with the perforation in one type of note sheet by which slow crescendo effects are obtained and to register with a perforation with another type of note sheet by which a mezzoforte effect is obtained, and register with a perforation in another type of note sheet which is adapted to control the rewinding of the roll. As a consequence, the tracker is provided with expression and other control openings $a$, $b$, etc., and $a'$, $b'$, etc., certain of which are adapted to register with the expression and control perforations in all of the types of note sheets which the piano is desired to play, and means are provided to select certain control openings in the tracker which are adapted to register with the expression and control perforations a selected type of note sheet for the proper control of the expression and other control mechanism to effect the proper response to the piano to that selected type of roll and render all other expression and control holes in the tracker inoperative and idle.

For this purpose, a plurality of selector valve boxes 105, 106 and 107 are provided. The player system herein illustrated is adapted to play three different types of note sheets and consequently three selector valve boxes are provided and a valve box may be provided for each different type of note sheet to be played. The valve boxes are similar in construction and but one will be described.

Fig. 8 is a sectional detail through one of said boxes, as for instance, the box 105. Said valve box includes a chamber 108 extending substantially throughout its length and said chamber is adapted to be placed in communication with a source of suction as the pump 20, and also with the atmosphere through the pipe 109. The valve boxes 106 and 107 respectively are adapted to be similarly placed in communication with the source of suction and with the atmosphere alternately through other similar pipes 110 and 111 by means hereinafter to be more particularly described. The cover plate 112 of said valve box 105 is or may be formed with the annular recesses 113 which have the conically shaped bottom walls 114. Tubes 115 are carried by said cover plate 112 and communicate with the annular chambers 113, and said tubes 115 are placed in communication with suitable control openings in the tracker by means of the tubes $116^D$. The selector valve box 106 is adapted to be connected with suitable control holes in the tracker corresponding to the control perforations in the note sheet associated with said selector valve box 106 by similar suitable conductors $117^A$. Said valve box 107 is similarly adapted to be connected with control openings in the tracker corresponding to control perforations in the particular type of sheet with which said selector valve box is to be used by suitable conductors $118^W$. It will be noted that some control openings in the tracker register with expression perforations in more than one type of note sheet and, consequently, valves in two or more selector valve boxes will be connected finally through a common conductor extended to the common control opening in the tracker. The various interconnected valves, however, are arranged to obtain different controls of the mechanism, as for instance, to obtain different degrees of expression and when a particular type of note sheet is played, all valves of all boxes but those associated with that particular note sheet are arranged to be inoperative.

Referring again to Fig. 9, tubes 120 extend through the cover plate 112 to the apexes of the bottom walls 114. Pouches 121 are disposed over said recesses 113 in position to seal the inner ends of the tubes 120. When a valve box is idle, atmospheric air is admitted into the chamber 108 and said pouches 121 are moved into position to cover and seal the ends of the tubes 120, and said tubes are normally under a slight suction whereby to hold the pouches in tube-closing position. Said pouches thereby serve as valves to establish or interrupt communication between the tubes 115 and 120. When a particular valve box is selected for operation, the chamber 108 thereof is placed in communication with a source of suction and the pouches 121 are thereby pulled back from sealing position with the tubes 120 and free communication is established between the tubes 115 and 120 and, consequently, from the control openings in the tracker to suitable control devices associated with said tubes 120.

Said selector valve boxes 105, 106, 107 are adapted to be rendered operative or inoperative at will by a suitable control valve. Said valve may consist of a plate 122 having spaced and aligned openings with which the pipes 109, 110, 111 communicate. A slide valve 123 is arranged to move over the lower face of the block 122 and said valve 123 may have the spaced and aligned openings 124 and 125 therein and another opening in line with the aforesaid openings with which a pipe 126 is in communication. Said pipe 126 is adapted to extend to a junction box 127 which is in communication with the pump 20 and is thereby under suction.

It is obvious that, as the plate 123 is moved in a position to establish communication between said pipe 126 and one of said pipes 109, 110, 111, the selector valve box associated with said pipe will be placed in communication with the source of suction and the box thereby will be rendered operative. The length of said plate 123 is such that when moved to the right, Fig. 1, it uncovers the ends of pipes 110 and 111 successively whereby to place the valve boxes associated with said pipe in communication with the atmosphere and renders said valve boxes inoperative. The openings 124 and 125 in said plate are adapted to admit atmospheric air to said valve boxes 105 and 106 when the valve plate 123 is moved toward the left. Suitable means herein diagrammatically illustrated as the hand lever 128 may be provided to move the valve plate 123 and hold it in any selected position. Said valve may also be associated with a valve not herein shown adapted to control the position of the division in the wind chest as set forth in my co-pending application filed December 8, 1921, Serial No. 520,860, whereby simultaneously to condition the wind chest and the expression and control mechanism for control by note sheets of different types.

The pipes 25 and 33 leading from the expression boxes 26 and 32 respectively extend to and communicate with the distributing box 127. Said box contains merely a chamber into which the various control pipes and tubes extend and serves as a suitable means for connecting the various pipes with the pump. A tube $24^a$ connects said distributing box 127 with a cut off box 130 which has means by which the pump can be cut off from the expression boxes and striker pneumatics when the player piano is operating to rewind the note sheet. Pipes 131 extend from the cut off box to the pump. Two pipes are herein shown and are used for convenience, although a single pipe of suitable size may be used when desired.

The cut off box 130 is illustrated sectionally in Fig. 19. Said box is formed with a chamber 132 therein with which the pipe $24^a$ is in communication and a pouch valve 133 is arranged to cover and uncover said pipe $24^a$ whereby to establish communication between said chamber 132 and the pipe $24^a$ and cut off such communication. The chamber 132 is in communication with the pipes 131 leading to the pump. The action of the pouch valve is governed through a tube 135 extended to a valve 136. Said valve is associated with the wind motor 137 and when the bellows 138 which controls the rewinding of the roll is operated, the arrangement is such that the movable member 139 of said valve 136 is raised to admit atmospheric air into said pipe 135. Due to the presence of atmospheric pressure behind said pouch valve 133 and the suction on the other side of said valve, the valve is moved to close the pipe $24^a$, and the striker pneumatics are thereby cut off from the pump during the rewinding of the note sheet. When the note sheet has been rewound the valve 136 is operated in more or less the usual manner to close said pipe 136. The air is exhausted from behind said pouch valve 133 through the bleed 140 and the passage of air from the expression boxes moves the valve away from the end of the pipe $24^a$ to permit the air to pass to the pump.

The selector valve box 105 is adapted to select control openings in the tracker which register with a certain type of note sheet, which may be herein termed a Type D note sheet, and the arrangement is such that it selects control openings $b$, $d$, $f$, $h$, $i$, $j$, $k$, in the bass side and the openings $b'$, $f'$, $h'$, $i'$, $j'$, $k'$, in the treble side of the tracker. The control opening $b$ is adapted to control the rewind mechanism and for this purpose serves to connect said opening through a proper selector valve in the selector valve box 105 which extends to a secondary valve 146 of usual construction which is arranged to control the rewind pneumatic 138. The control opening $d$ is adapted to control the loud pedal pneumatic 147 and for this purpose, a suitable valve in the valve box 105 is arranged to place said opening in communication with the tube 148 which extends to the pouch of a secondary valve block 149 and a pouch of a primary valve 150 to effect the collapse of the loud pedal pneumatic 147. The soft pedal pneumatic 151 is controlled from the tracker opening $b'$ disposed in the treble side of the tracker and serves to place said opening $b'$ in communication with a tube 152 which extends to a secondary valve box 149 to effect the control of a primary valve 153 associated with the soft pedal pneumatic 151 in a manner similar to the control of the loud pedal pneumatic.

The primary and secondary valves are or may be of more or less common construction. The secondary valve construction is shown in Fig. 14 which shows a transverse section through a valve. The valve box is divided into three superimposed compartments 155, 156, 157. The compartment 155 is separated from the compartment 156 by a pouch 158. Said compartment 156 is adapted to be connected with the source of suction and when atmospheric pressure exists in the lower compartment 155 said pouch is raised by the suction whereby to raise the valve 159. A small bleed passage 160 normally connects the two chambers 155 and 156. The valve 159 controls communication between the chambers 156 and 157. When said valve is in its low position, as shown, atmospheric pressure exists in the upper compartment 157 and is established through the aperture 161 in the top wall of the box. Consequently, apparatus placed in communication with said upper chamber is at atmospheric pressure. When the pouch 158 is raised, it moves said valve 159 upward to cover the opening 161 and thereby seal said upper compartment 157 from the atmosphere and place it in communication with the lower compartment 156 and under suction, and, consequently, place the apparatus in communication by said upper apparatus 157 under suction.

The cross section through a primary valve box is illustrated in Fig. 15. Said valve box includes two superimposed compartments 163 and 164. Said lower compartment 163 is adapted to be placed in communication with a source of suction through the pipe 165 and the upper compartment 164 is adapted to be placed in communication with the apparatus to be controlled by suitable means as the pipe 166. Communication is established between the two compartments through the opening 167 whereby to place both compartments under suction and the upper compartment is adapted to be placed in communication with the atmosphere through the opening 168, and both of said openings are controlled by the valve 169. A pouch 170 is disposed in the lower compartment 163 and atmosphere or suction may be admitted to the back thereof through the pipe 171. When atmosphere is admitted to the back of said pouch, the pouch is raised to move the valve 169 upward to cover the opening 167 and uncover the opening 168 and thereby to cut off communication between the two compartments 163 and 164 and establish atmospheric pressure in the upper compartment 164.

The bass and treble theme accents are controlled by the tracker openings $f$ and $f'$ respectively and said openings are placed in communication, through the selector valve box 105, with the tubes 175 and 176 respectively, and said tubes are connected with a secondary valve box 177 which controls respectively the accent pneumatics 70 and 71 of the expression box. The various degrees of intensity extending from No. 1 intensity (pianissimo) to No. 4 intensity (fortissimo) are controlled from control openings $h$, $i$, $j$, $k$, and $h'$, $i'$, $j'$, $k'$, on the bass and treble sides of the tracker respectively and said openings are in control, through said selector valve box 105, the tubes $180^a$, $180^b$, etc., $181^a$, $181^b$, etc., the primary valve box 182, the tubes $183^a$, $183^b$, etc., and $184^a$, $184^b$, etc., of the proper pouch valves in the expression boxes 26 and 32.

Another type of note sheet is or may be arranged to control the expression mechanism to obtain various degrees of expression effect through the medium of lock and cancel valves through which the control openings in the tracker effect the control of the various pouch valves and crescendo bellows of the expression box.

The lock and cancel valves are so arranged that when an opening in the tracker is uncovered, the valve is moved into one position, and the valve remains in such position until another opening in the tracker is uncovered, and said second opening is arranged to effect the closing of the valve or to "cancel" the valve. A lock and cancel valve box 230 is illustrated in Figs. 10, 11, 12 and 13. Said valve box is or may be divided into a plurality of chambers 190 disposed on one side of the box and other opposed chambers 191 disposed in the other side of the box. Said chambers are separated by the partition 192 which is formed with top and bottom chambers 193 adapted to be placed in communication with the source of suction through the pipe 194. Valve plates 195 and 196 are arranged on opposite sides of said separating wall 192 and are formed with suitable apertures therein. Ducts 197 serve to establish communication between said suction ducts 193 and the under side of said valve plates. A valve stem 198 is slidably disposed in said supporting wall 192 and extends through the apertures in said valve plates 195 and 196 and carries at its ends, the valve discs 199 and 200. A lock pouch 201 is arranged to engage one end of said valve stem and move the valve disc 200 against the plate 196 and thereby close the aperture and cut off communication between said chamber 190 to the suction ducts 193, and at the same time move the valve disc 199 away from the valve plate 195 and place said chamber 191 in communication with the suction ducts 193. A cancel pouch 202 is disposed in said opposite chamber 191 to engage the end of the valve stem 198 in said chamber and move the valve stem in the reverse direction and cut off communication between said chamber 191 and the suction ducts 193. Atmospheric air or suction may be admitted to the back of said pouches 201 and 202 through said tubes 203 and 204 respectively, and apparatus to be controlled is adapted to be placed in communication with the chamber 191 through the tubes 205. It is obvious that when either of the pouches operates to move the valve in one direction, the valve will remain in its moved position until the other pouch is operated to restore the valve to its former position.

Small air bleeds 206 and 207 are arranged to admit a slight flow of air into said chambers 190 and 191, and similar bleeds $206^a$ and $207^a$ are arranged to provide small leak openings between the back of said pouches 201 and the chamber 190 and the back of the pouches 202 and chamber 191.

Relay valves are adapted to be placed in the tubes extending from the lock and cancel valves to suitable devices to be controlled, as the various expression pouch valves of the expression boxes for instance, for the purpose of obtaining a more rapid response of said devices when controlled by the tracker. Fig. 16 illustrates a valve block having relay valves well adapted for the purpose, and Fig. 17 illustrates a cross section of one of the valves. The relay valve is or may be more or less similar in construction to the cut off valve illustrated in Fig. 19 and includes the two spaced blocks 210 and 211. A passage 212 is formed in said block 210 and is adapted to be placed in communication with suitable devices to be controlled through the tube 213. A pouch valve 214 is arranged to govern communication between said passage 212 and the chamber 215 between said blocks 210 and 211; and said chamber is adapted to be under atmospheric pressure, the atmosphere having access thereto through the cover plates 216 of said chamber, and said cover plates may be made of porous material, as felt. The pouch valve 214 is controlled by admitting suction or atmospheric pressure to the back thereof through the tube 217. A light compression spring 218 serves normally to hold said valve 218 closed and thereby to seal the passage 212 from communication with the atmosphere. When said tube 217 is connected to a source of suction as, for instance, by means of a lock and cancel valve, the pouch valve 214 is operated to uncover the end of said passage 212 and the apparatus in communication therewith is thereby placed in communication with the atmosphere.

A similar type of relay valve is illustrated in Fig. 18, with the exception that the pouch valve 220 is adapted to control the communication between the two tubes 221 and 222. In this construction, the chamber 223 in which said pouch valve is located is sealed from the atmosphere and no pouch spring is employed.

The selector valve box 106 is adapted to condition the system for the playing of a particular type of note sheet which may herein be termed a Type A note sheet and is arranged to select the control openings $b$, $c$, $d$, $e$, $g$, $h$, and $i$ in the bass side of the tracker and said openings are adapted to control respectively the slow crescendo, No. 1 expression, loud pedal, No. 2 expression, fast crescendo, No. 3 expression, and the cancelling of the expression controls. It is also adapted to select openings $b'$, $c'$, $d'$, $e'$, $g'$, $h'$ and $i'$, and $j'$ in the treble side of the tracker and said openings are adapted to control respectively the slow crescendo, No. 1 expression, soft pedal, No. 2 expression, fast crescendo, No. 3 expression, the cancelling of the expression controls and the rewinding of the note sheet. The remaining openings in the tracker will be idle when the Type A note sheet is in control of the instrument.

To condition the apparatus to respond properly to the Type A note sheet, the selector valve 123 for the selector valve boxes is moved toward the left, Fig. 1, to place the pipe 126 in communication with the suction pipe 110 leading to the valve box 106. With the Type A note sheet, lock and cancel valves are arranged to control various degrees of intensity and said lock and cancel valves are contained in the box 230. When other types of note sheets are played, said valve box is adapted to be idle but the selector valve 123 is adapted to render said lock and cancel valve active and, for such purpose, is arranged to admit suction to said block through the pipe 231 which is teed into the pipe 110. Said pipe 231 extends to a valve block 232, the construction of which is substantially the same as the valve illustrated in Fig. 19, and serves to open and close the pipe 253 extending to the valve block 230 whereby to control communication between said pipe and a suction pipe 234 extended to the distributing box 127. The bass tracker openings corresponding to No. 1 expression, No. 2 expression, and No. 3 expression are connected to the upper or lock side of the valve box 230 by means of the tubes $235^a$, $235^b$, $235^c$. The corresponding holes for the treble side of the tracker are similarly connected by means of the tubes $236^a$, $236^b$, $236^c$.

The Type A note sheet perforation system is such that the cancel perforation in the note sheet is adapted to cancel all of the lock valves which may have previously been opened by the registration of the expression perforations of the note sheet with the corresponding openings in the tracker and, consequently, the valves which control the expression effect of the bass notes are adapted to be cancelled simultaneously from the tracker through the tube 237 which extends to a valve in the primary box 182 and thence through the tube 238 to said valves. The cancelling action is as described in connection with the lock and cancel valve box illustrated in Fig. 10. In the same manner are various degrees of expression for the treble side of the instrument are cancelled by means of the tube 239 which is connected with a valve in said primary valve box 182 and a tube 240 connected with the cancel valves associated with the treble side of the valve box 230. The control for the bass expression passes through the lock and cancel valve box 230 and the relay valve box 242. The construction of said relay valve block is illustrated in Figs. 16 and 17. From the relay block 242 the control passes through tubes $243^a$, $243^b$, $243^c$, to valves in the primary valve block 182 where said conductors are teed in with tubes 180ᶜ, 180ᵇ, 180ᵃ, which correspond to similar degrees of expression for the Type D note sheet previously described. The control then passes to the bass expression box 26. In a similar manner the control for the treble side of the system is passed through tubes 244ᵃ, 244ᵇ, 244ᶜ, through the relay box 245 and thence through tubes 246ᵃ, 246ᵇ and 246ᶜ to valves in the primary valve box 182 which tubes are teed in with the tubes 181ᵃ, 181ᵇ, 181ᶜ, and thence through said latter tubes to the treble expression box 32. For the Type A note sheet, the bass side of the wind chest is controlled by the expression box 26 and the treble side of the wind chest by the expression box 32. Consequently, the treble side of the wind chest is adapted to be cut-off from the expression box 26, by the operation of the valve 90, see Fig. 5. For this purpose a tube 247 is extended from the bellows 91 of said valve to a relay valve in the secondary valve block 248 and the control is thence passed through a tube 249 to the suction pipe 231 which controls the cutting in and out of the lock valve block 230. With this arrangement, it is seen that, when the selector valve 123 is positioned to select the selector valve box 106, it establishes suction in said tube 249, and the suction operates the pouch in the secondary valve block 248 to place the bellows 91 under suction and thereby to operate the valve 90.

Slow crescendo control for the bass side of the tracker is provided through the tube 251 which extends from an appropriate valve in the selector valve box 106 to a valve in the secondary valve block 248 and the control thence passes through tube 251ᵃ to the slow crescendo bellows 83. The fast crescendo control is provided through a tube 253 which is connected with a valve in the secondary valve block 248 and the control thence passes through tube 253ᵃ to the fast crescendo bellows 82. Similarly fast crescendo control for the treble side of the apparatus is provided through the tube 255 which communicates with a suitable valve in the secondary valve block 248 and thence through the tube 255ᵃ to the fast crescendo bellows 47. In the same manner the slow crescendo is controlled through a tube 256 connected with a valve in said valve box 248 and a tube 256ᵃ which is in communication with the slow crescendo bellows 53. The loud and soft pedal effects and the rewinding of the note sheet are effected in more or less the usual manner and need not be described.

For a third type of note sheet, which may be termed a Type W note sheet, the various degrees of expression are effected, not by governing the opening and closing of the pouch valves associated with the expression boxes, but by means of the fast and slow crescendo bellows, and by holding the valves controlled by the crescendo bellows in a predetermined fixed position to obtain a certain definite degree of intensity, as mezzoforte. Lock and cancel valves are also interposed between the tracker and the expression controlling devices. For said third type of note sheet, the selector valve 123 is moved to its furthest position to the left (Fig. 1) whereby to place the pipe 126 in communication with the pipe 111 of said selector valve box 107 and thereby establish suction in said box and render said box operative. Said selector box valve 107 is adapted to select tracker openings $b, c, d, e, g, h, i, j$, on the bass side of the tracker and said openings correspond to mezzoforte-on, mezzoforte-off, crescendo-on, crescendo-off, forzando-on (fast crescendo-on), soft pedal-off respectively. Said valve box is also adapted to select openings $b', c', d', e', g', h', i', j'$, and $l'$ on the treble side of the tracker and said openings correspond to the corresponding openings in the bass side of the tracker with the exception that openings $i'$ and $j'$ are loud pedals off and on respectively and opening $l'$ controls the rewinding of the note sheet. The control from the tracker is passed through lock and cancel valves in the valve box 270 and certain perforations in the note sheet are adapted to register with the crescendo-on opening $e$ to open the valve associated with said opening and said valve will remain open until another opening in the note sheet is passed over the opening $d$ in the tracker which corresponds to crescendo-off whereupon the arrangement is such that said valve is restored to its original position and the crescendo bellows is returned by its spring to its original position. The other controls are effected in a similar manner. The bass crescendo is controlled by the tube 271 which extends from a valve in the valve box 270 controlled by the corresponding crescendo-off and crescendo-on openings in the tracker, and said tube extends to a valve 272 which is or may be similar to the valve illustrated in Fig. 17. Said valve serves to control admission of suction or pressure to the tube 273 which is teed into the tube 251. Said tube 251 also extends to a valve in the selector valve box 106 by which slow crescendo effects for the Type A note sheets are obtained. The slow crescendo on the treble side of the instrument is similarly obtained through the tube 274 and the corresponding valve 275 which is teed into the tube 256 by which slow crescendo effect for the Type A note sheet is obtained. Forzando is practically the same as the fast crescendo of the Type A note sheet and the tube 278 extended from the forzando-on valve on the bass side of the selector valve box 107 is connected or teed in with the conductor 253 extending from the bass fast-crescendo valve of the Type A valve box 106; and forzando control is effected in the same manner and through the same apparatus as fast-crescendo control of the Type A note sheet.

Inasmuch as the slow crescendo bellows for both the treble and bass sides of the expression box operate through the fast crescendo bellows and the slow crescendo bellows may be collapsed to a greater or less extent when it is desired to effect crescendo off control, the forzando-off openings in the bass and treble sides of the tracker are arranged to cause the opening of both slow crescendo bellows 83 and 47 respectively. Consequently, the selector valve in the selector box 107 corresponding with the forzando-off opening *g* in the tracker is arranged to control the tube 280. Said conductor 280 extends to a secondary valve in the secondary valve box 248 and said valve is arranged to admit suction or pressure in the tube 281, and said tube controls a valve 282 which may be constructed similar to the valve illustrated in Fig. 17 and, when the forzando-off opening in the tracker is uncovered serves to admit atmospheric air to the tube 283 whereby to effect the rapid opening of the slow crescendo bellows 83; and said tube 283 is connected with the tube 88ª of said slow crescendo bellows.

In the same manner, the forzando-off selector valve for the treble side of the selector valve box 107 controls a tube 285 which extends to a valve in the secondary valve box 248 and controls admission of suction or atmospheric pressure to a tube 286, which in turn controls a valve 287 which is or may be similar to the valve 282. Said valve 287 serves, when controlled, to admit atmospheric air to the tube 288 arranged in communication with the large passage in the slow crescendo bellows 53.

The mezzoforte is obtained by actuating the slow crescendo bellows 83 or 53 as the case may be to move the slide valves associated with said bellows to a position to partially close the slots 46 and 80 through which atmospheric air is admitted to the expression boxes 26 and 32, and said valves are arranged to be held in such position for the duration of the mezzoforte effect. For this purpose, the plates 43 and 79 of the expression boxes 26 and 32 have the passages 300 and 301 which extend through the said plates under the slide valves and in such positions as normally to be covered by said slide valves. When, however, said valves are actuated by the bellows associated therewith to move to close said slots, the rear edges of said valves are arranged to uncover said passages, and the position of said passages with respect to said valves is arranged to determine the position in which said slide valves will be held for mezzoforte.

Tubes 302 and 303 are arranged in communication with said passages and are adapted to be connected with appropriate tubes by which the control of the mezzoforte is effected. Said openings 300 and 301 are adapted to control respectively the bass and treble slow crescendo bellows 53 and 83 by admitting atmospheric air therein as said bellows are being collapsed to increase the intensity of the instrument, and whereby to arrest the collapse of the bellows. Said bellows will thereupon tend to open but in doing so the slide valves will be moved to close the openings 300 and 301 and suction pressure will again be established in said bellows and they will be again collapsed. This action will be repeated so long as the mezzoforte control is on.

Valves 304 and 305 are controlled by the mezzoforte on and off openings in the tracker whereby to place said passages 300 and 301 in communication with the slow crescendo bellows for the mezzoforte effect. Said valves 304 and 305 are or may be similar in construction with the valve illustrated in Fig. 17 with the exception that the chamber, corresponding to the chamber 215 in Fig. 17, is adapted to be sealed from the atmosphere and placed in communication with a passage 300 or 301 and, in the valve 304, said chamber is placed in communication with the passage 300 by means of the tube 306 and, in said valve 305, said chamber is placed in communication with the passage 300 by means of the tube 307; and said valve 304 is controlled through the tube 308 by the mezzoforte lock valve and when said valve is operated and suction is admitted to said tube 308, the pouches of said valves are raised. Communication is thereby established between said passage 300 through the valve 304 and the tubes 310 and 311 which tubes connect with both crescendo bellows in the same manner. The valve 305 is controlled from the bass mezzoforte valve through the tube 312 and when suction is admitted to said tube, the pouches in said valve 305 are raised to place the opening 301 in communication with both fast and slow crescendo bellows by means of the tube 307 and the tubes 314 and 315. With the Type W note sheet, when a mezzoforte effect is to be obtained, both slow crescendo-on and mezzoforte-on perforations are formed in the note sheet. With this arrangement, the slow crescendo bellows is actuated to move its slide valve and raise the intensity of the striker pneumatics associated with it but the mezzoforte perforation serves to restrict the collapsing movement of the slow crescendo bellows and hold it in a definite position until the control is cancelled.

Other controls for the rewinding of the note sheet and the loud and soft pedals, for instance, are or may be effected in more or less the usual manner.

The pump 20 may be stopped automatically after the note sheet has been rewound by suitable means controlled by the uncovering of an opening 320 (Fig. 7) in the lower roll 102 and the uncovering of said passage may serve to effect the control of the stopping apparatus in a well known manner.

When the apparatus here shown is adapted to correctly reproduce the characteristic shadings of the compositions embodied in three different types of note sheets, a similar arrangement and disposition of the control and expression elements will be arranged to condition the apparatus to respond accurately to other different types of note sheets.

Said expression box and pump have the characteristic of providing inherent regulation of the pressure at the striker pneumatics, regardless of the particular expression at which the expression box is set to operate and the number of striker pneumatics operated and consequently the usual pressure regulating valve and operating bellows, or equivalent regulating apparatus is rendered superfluous.

It is obvious that the construction and arrangement herein shown may be modified without departing from the spirit of the invention.

I claim:

1. In a musical instrument, the combination of striker pneumatics, a source of power for said striker pneumatics, and means to produce various operative effects of said source of power on said striker pneumatics comprising means having air passages having fixed dimensions and provided with openings arranged in fixed communication with the atmosphere to admit atmospheric air to said source of power and means completely to open and also completely to close said passages, said means arranged to be held in one or the other of the aforesaid relations for the production of a particular operative effect.

2. In a musical instrument, the combination of striker pneumatics, a source of power for said striker pneumatics, a connection between both, and means to produce various operative effects of said source of power on said striker pneumatics comprising means having air passages having fixed dimensions and provided with openings arranged in fixed communication with the atmosphere to admit atmospheric air to said connection and means completely to open and also completely to close said passages, said means arranged to be held in one or the other of the aforesaid relations for the production of a particular operative effect.

3. In a musical instrument, the combination of striker pneumatics, a source of suction for said striker pneumatics including a suction pump characterized by maintaining a constant suction effect regardless of the number of striker pneumatics in operation, and means to produce various operative effects of said source of suction upon said striker pneumatics comprising means having air passages having fixed dimensions and provided with openings arranged in fixed communication with the atmosphere to admit atmospheric air to said source of suction and means completely to open and also completely to close said passages, said means arranged to be held in one or the other of the aforesaid relations for the production of a particular operative effect.

4. Expression controlling apparatus for a musical instrument comprising a pump characterized by maintaining substantially constant suction pressure at any expression setting for which the apparatus is set, regardless of the number of striker pneumatics set in action, and means to vary the expression setting of the apparatus comprising means to admit unregulated air to the inlet of said pump and means to vary the admission of air in accordance with the expression setting desired.

5. In a musical instrument, the combination of striker pneumatics, a tracker, a pump characterized by maintaining substantially constant suction pressure at any operative effect for which the apparatus is set, regardless of the number of striker pneumatics set in action, and means to produce various operative effects of said pump on said striker pneumatics comprising means to admit unregulated air to the inlet of said pump and means governed by said tracker to vary the admission of air in accordance with the operative effect desired.

6. Expression-controlling apparatus for a musical instrument comprising a suction pump characterized by maintaining substantially constant suction at various settings of the expression controlling apparatus, and expression controlling apparatus having means to admit unregulated air to the inlet of said pump to vary the expression setting of the apparatus and means to vary the admission of air in accordance with selected expression effects.

7. In a musical instrument, the combination of two groups of striker pneumatics, a pump arranged to create a pressure to operate said striker pneumatics, an expression device associated with said striker pneumatics and with said pump, said expression device having two cooperating units, each unit associated with a group of striker pneumatics and each unit having means to admit atmospheric air therein to produce various operative effects of the pump on its group of striker pneumatics and means independently to control the admission of air to each unit in accordance with the operative effects desired.

8. In a musical instrument, the combination of two groups of striker pneumatics, a pump arranged to create a pressure to operate said striker pneumatics, an expression controlling device associated with said striker pneumatics and pump, said expression-controlling device having two cooperating units, each unit associated with a group of striker pneumatics, whereby independently to control the expression effects of said groups of striker pneumatics, a restricted connection between each of said units and said pump, and means to admit atmospheric air independently into said units, and means to govern the admission of air into each unit.

9. Expression controlling apparatus for pneumatically-operated musical instruments including an expression box having a plurality of passages of fixed dimensions having openings of fixed and constant dimensions arranged in fixed communication with the atmosphere, whereby to admit atmospheric air into the box, and means arranged only to completely close and to completely open said passages.

10. Expression controlling apparatus for a pneumatically actuated musical instrument comprising an expression box having a plurality of graduated apertures therein for the admission of atmospheric air, and means to govern the opening and closing of said apertures.

11. Expression controlling apparatus for a pneumatically actuated musical instrument comprising an expression box having a plurality of apertures therein for the passage of atmospheric air into the box, said box also having an aperture in series with the aforesaid apertures, and means to govern the extent of said last mentioned aperture.

12. Expression controlling apparatus for a pneumatically actuated musical instrument comprising an expression box having a plurality of apertures therein for the admission of atmospheric air, valves governing said apertures, said box also having an aperture in series with the aforesaid apertures, a slide valve governing said last mentioned aperture and a bellows controlling said slide valve.

13. Expression controlling apparatus for a pneumatically actuated musical instrument comprising an expression box having an aperture for the admission of atmospheric air, a slide valve governing said aperture, a bellows controlling said slide valve, and means to control the position of said slide valve, over said aperture comprising means to govern the pressure conditions within said bellows.

14. Expression controlling apparatus for a pneumatically actuated musical instrument comprising an expression box having an aperture for the admission of atmospheric air, a slide valve governing said aperture, a bellows controlling said slide valve, and means to control the position of said slide valve over said aperture comprising means to admit atmospheric air to said bellows at a predetermined position of said slide valve.

15. Expression controlling apparatus for a pneumatically actuated musical instrument comprising an expression box having an aperture for the admission of atmospheric air, a slide valve governing said aperture, a bellows controlling said slide valve, said box having a passage opened to the atmosphere by said slide valve, and a control connection between said passage and said bellows.

16. Expression controlling apparatus for a pneumatically actuated musical instrument comprising an expression box having an aperture for the admission of atmospheric air, a slide valve governing said aperture, a bellows controlling said slide valve, said box having a passage disposed to be opened to the atmosphere by said slide valve, a control connection extended between said passage and bellows, and a valve in said connection between said slide valve and bellows.

17. Expression controlling apparatus for a pneumatically actuated musical instrument comprising an expression box having an aperture for the admission of atmospheric air, a slide valve controlling said aperture, and two bellows each having means to operate said slide valve.

18. Expression controlling apparatus for a pneumatically actuated musical instrument comprising an expression box having an aperture for the admission of atmospheric air, a slide valve controlling said aperture, a bellows connected positively with said valve to operate it and a second bellows having means to collapse said first bellows and operate said valve.

19. Expression controlling apparatus for a pneumatically actuated musical instrument comprising an expression box having an aperture for the admission of atmospheric air, a slide valve controlling said aperture, a bellows connected positively with said valve to operate it, and a second bellows having means to engage said first bellows to collapse it whereby to operate said valve.

20. Expression controlling apparatus for a pneumatically actuated musical instrument comprising an expression box having an aperture for the admission of atmospheric air, a slide valve controlling said aperture and two bellows each having means to operate said slide valve, one of said bellows arranged to operate said valve through said other bellows.

21. Expression controlling apparatus for a pneumatically actuated musical instrument comprising an expression box having an aperture for the admission of atmospheric air, a slide valve controlling said aperture, a bellows to operate said valve, and means to effect the slow collapse of said bellows and the slow and also the rapid opening of said bellows.

22. Expression controlling apparatus for a pneumatically actuated musical instrument comprising an expression box having an aperture for the admission of atmospheric air, a slide valve controlling said aperture, a rapidly collapsible bellows connected with said valve whereby to operate it, and a slowly collapsible bellows arranged to engage said rapidly collapsible bellows and collapse it whereby to operate said valve.

23. Expression controlling apparatus for a pneumatically actuated musical instrument comprising an expression box having an aperture for the admission of atmospheric air, a slide valve controlling said aperture, a rapidly collapsible bellows connected with said valve whereby to operate it, and a slowly collapsible bellows having means to engage said rapidly collapsible bellows and collapse it whereby to operate said valve, said slowly collapsible bellows having means whereby it may be slowly opened and also rapidly opened.

24. Expression controlling apparatus for a musical instrument comprising an expression box having two compartments associated both with the striker pneumatics and pump of the instrument, said box having apertures of fixed dimensions for the admission of atmospheric air independently to each compartment, valves controlling said apertures, said box also having a communicating passage between said compartments, and a valve in said passage to control the communication between said compartments.

25. In a musical instrument, the combination of bass and treble striker pneumatics, a pump, an expression controlling device comprising a box having two compartments connected with said pump, said box having apertures of fixed dimensions to admit atmospheric air independently to each compartment, valves controlling said apertures, means separately to connect the bass and treble striker pneumatics in communication with both of said compartments, and means to isolate said pneumatics from one of said compartments.

26. In a musical instrument, the combination of bass and treble striker pneumatics, a pump, an expression controlling device comprising a box having two compartments connected with said pump, said box having apertures of fixed dimensions to admit atmospheric air to each compartment, valves controlling said apertures, means separately to connect the bass and treble striker pneumatics in communication with both of said compartments, and means to isolate one group of striker pneumatics from either compartment.

27. In a musical instrument, the combination of bass and treble striker pneumatics, a pump, an expression controlling device comprising a box having two compartments connected with said pump, said box having apertures to admit atmospheric air to said compartments, valves controlling said apertures, means separately to connect the bass and treble striker pneumatics in communication with both of said compartments, and means to isolate one group of striker pneumatics from one of said compartments, and means to isolate the other group of striker pneumatics from either compartment.

28. In a musical instrument, the combination of striker pneumatics, a pump, an expression controlling device comprising a box having two compartments connected with said pump, said box having apertures to admit atmospheric air to said compartments, valves controlling said apertures, and means to connect said striker pneumatics with either of said compartments.

29. In a musical instrument, the combination of striker pneumatics, a pump, an expression controlling device comprising a box having two compartments connected with said pump, said box having apertures to admit atmospheric air to said compartments, valves controlling said apertures, and means to control the operative effects of said striker pneumatics from either of said compartments.

30. In a musical instrument, the combination of a tracker, striker pneumatics, a pump associated with said striker pneumatics, dual means governed by the tracker to produce substantially equivalent operative effects of the pump on the striker pneumatics and means to shift the control of the tracker from one to the other of said dual means.

31. In a musical instrument, the combination of a tracker, striker pneumatics, a pump associated with said striker pneumatics, expression controlling apparatus arranged to produce various operative effects of said pump on said striker pneumatics comprising an expression box in communication with said pump and said striker pneumatics, said box having an aperture for admission of atmospheric air therein, a valve controlling said aperture, said box also having an aperture in series with the aforesaid aperture and valve, a valve governing said last aperture, means to operate said last named valve, and means to select either of said valves for control by said tracker.

32. In a musical instrument, the combination of a tracker, striker pneumatics, a pump associated with said striker pneumatics, expression apparatus arranged to vary the operative effect of said pump on said striker pneumatics, comprising an expression box connected with said striker pneumatics and pump, a passage for the admission of atmospheric air to said box, two valves governing said passage, a lock and cancel valve governing each valve, and means to select either of said lock and cancel valves for the control of its expression box valve by said tracker and disable said other lock and cancel valves.

In testimony whereof, I have signed my name to this specification.

SAMUEL H. PERRON.